(12) United States Patent
DeBlaey et al.

(10) Patent No.: US 8,095,889 B2
(45) Date of Patent: Jan. 10, 2012

(54) HEURISTIC AND INTUITIVE USER INTERFACE FOR ACCESS CONTROL SYSTEMS

(75) Inventors: Ron DeBlaey, New Berlin, WI (US); Jeffrey S. Zingsheim, Franklin, WI (US)

(73) Assignee: Honeywell International Inc., Morristown, NJ (US)

( * ) Notice: Subject to any disclaimer, the term of this patent is extended or adjusted under 35 U.S.C. 154(b) by 677 days.

(21) Appl. No.: 12/119,122

(22) Filed: May 12, 2008

(65) Prior Publication Data
US 2009/0282366 A1 Nov. 12, 2009

(51) Int. Cl.
*G06F 3/00* (2006.01)
(52) U.S. Cl. ........ 715/811; 715/712; 715/713; 715/705; 715/822
(58) Field of Classification Search ................. 715/712, 715/713, 705, 822, 811
See application file for complete search history.

(56) References Cited

U.S. PATENT DOCUMENTS

| | | | |
|---|---|---|---|
| 4,862,498 A | 8/1989 | Reed | |
| 6,266,060 B1 | 7/2001 | Roth | |
| 6,310,634 B1 * | 10/2001 | Bodnar et al. | 715/854 |
| 7,865,829 B1 * | 1/2011 | Goldfield et al. | 715/708 |
| 7,877,686 B2 * | 1/2011 | Abbott et al. | 715/712 |
| 2002/0175930 A1 * | 11/2002 | Kolde et al. | 345/705 |
| 2004/0036715 A1 * | 2/2004 | Warren | 345/713 |
| 2008/0059882 A1 * | 3/2008 | McKirchy | 715/705 |

FOREIGN PATENT DOCUMENTS

| | | |
|---|---|---|
| DE | 102 35 549 | 10/2003 |
| GB | 2 397 206 | 7/2004 |

OTHER PUBLICATIONS

United Kingdom Intellectual Property Office Examination & Search Report for application No. GB0907205.9 dated Aug. 7, 2009 (7 pages).
Office Action dated Aug. 19, 2009 for GB Patent Application No. 0907205 (2 pages).

* cited by examiner

*Primary Examiner* — Dennis Bonshock
(74) *Attorney, Agent, or Firm* — Husch Blackwell LLP

(57) ABSTRACT

The present invention advantageously provides a method for interfacing an access control system and an input device, comprising the steps of displaying, on the input device, a set of choices from a plurality of choices, receiving one choice, and modifying the displayed set of choices based on the one choice, wherein modifying is performed by a heuristic method and/or a usage-based method. The heuristic method determines if one choice is a request for additional information, and, if it is, modifies the choices to include the additional information, and to exclude advanced and typical choices; and, if not, modifies the choices to include the advanced and typical choices. The usage-based method comprises incrementing a choice counter, if the counter is greater than multiple choices, modifying the choices to extra emphasize the choice, and if not, modifying the to emphasize the choice.

16 Claims, 7 Drawing Sheets

1. Operator/User being asked for optional (non-essential) information:

| Would you also like to < perform an advanced operation >? |
   | [ Yes ]   [ No ]   [ Explain ] |

2. Operator/User being asked for essential information:

| Please < perform an operation > |
   | [ OK ]   [ How? ]   [ Why? ] |

3. Operator/User being asked for confirmation:

| Are you sure you want to < perform an operation >? |
   | [ Yes ]   [ No/Cancel ]   [ Explain ]   [ Don't ask this again ] |

4. Operator/User being alerted to an atypical event (error):

| Attention! < an operation > could not be performed |
   | [ OK ]   [ Why? ] |

FIGURE 3

HEURISTIC AND INTUITIVE USER INTERFACE FOR ACCESS CONTROL SYSTEMS

FIELD OF THE INVENTION

This invention relates generally to security systems or access control systems for monitoring and controlling access to restricted areas. In particular, this invention relates to a system and method providing a heuristic and intuitive user interface for access control systems.

BACKGROUND OF THE INVENTION

Access control systems provide security to homes and businesses by controlling access to a facility and preventing unwanted intrusions, an by providing notification of events or unusual activities at the facility. Generally, an access control system has both hardware and software that are integrated to provide security technologies. Most systems contain access control panels that operate with software to control access, identify users, and detect intruders.

Access control systems have many features and are complicated to configure and maintain, and access control software has historically put the responsibility for understanding requirements and procedures necessary to program and operate an access control system upon the user. This is usually not an issue for large institutions—such as banks and insurance companies—who can afford to train and keep a specialist on staff. However, sites with few personnel, such as owner-operated businesses, for example jewelry stores, small offices for professional services, for example doctors, lawyers, accountants, and warehouses, or sites whose personnel have no or minimal technical background, cannot afford to train someone to understand the concepts and complicated software necessary or required in typical access control programs. What is needed is software with an intuitive user interface design that guides an untrained operator through the setup process and daily operation of the access control system, but which also provides the breadth of functionality required by expert users.

SUMMARY OF THE INVENTION

The present invention advantageously provides a novel system and method employing heuristic and usage-based approaches to create an intelligent, dynamic user interface (UI) for access control software. The heuristic method can be used to intelligently render options or controls in the access control system's UI that are consistent with the level of expertise of a user. In this method, the user's level of expertise is determined or deduced based upon the user's responses, or lack thereof, to questions or options posed to him while he goes about accomplishing his task(s). The usage-based method can be used to modify one or more UI controls, "promoting" a control, such as an option, parameter, or feature, to greater significance or prominence in the interface based upon the frequency with which it has historically been utilized. In this way, the user is given easier and/or more direct access to more frequently used controls.

The present invention advantageously provides a method for interfacing an access control system and an input device, comprising the steps of displaying, on the input device, a set of choices from a plurality of choices, receiving one choice of the displayed set of choices, and modifying the displayed set of choices based on the one choice, wherein modifying is performed by either a heuristic method and/or a usage-based method. The input device can be accessed through the internet or through a control panel of the access control system.

The heuristic method determines if one choice is a request for additional information, and, if it is, modifies the displayed set of choices to include the additional information, and to exclude advanced choices and typical choices; and, if it is not, modifies the displayed set of choices to include the advanced choices and the typical choices. The choices can be setup choices.

The usage-based method comprises incrementing a count of the one choice, if the count is greater than multiple choices, modifying the displayed set of choices to extra emphasize the one choice, and if the count is not greater than the multiple choices, modifying the displayed set of choices to emphasize the one choice. The emphasis, or emphasize, is performed by one of bolding, outlining, and highlighting the one choice. The extra emphasis is performed by performing the emphasis on the one choice and adding an asterisk to the one choice.

BRIEF DESCRIPTION OF THE DRAWING

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 3 shows typical access control panel scenarios;

The foregoing and other objects, aspects, features, advantages of the invention will become more apparent from the following description and from the claims.

DISCLOSURE OF THE INVENTION

Figure 1:
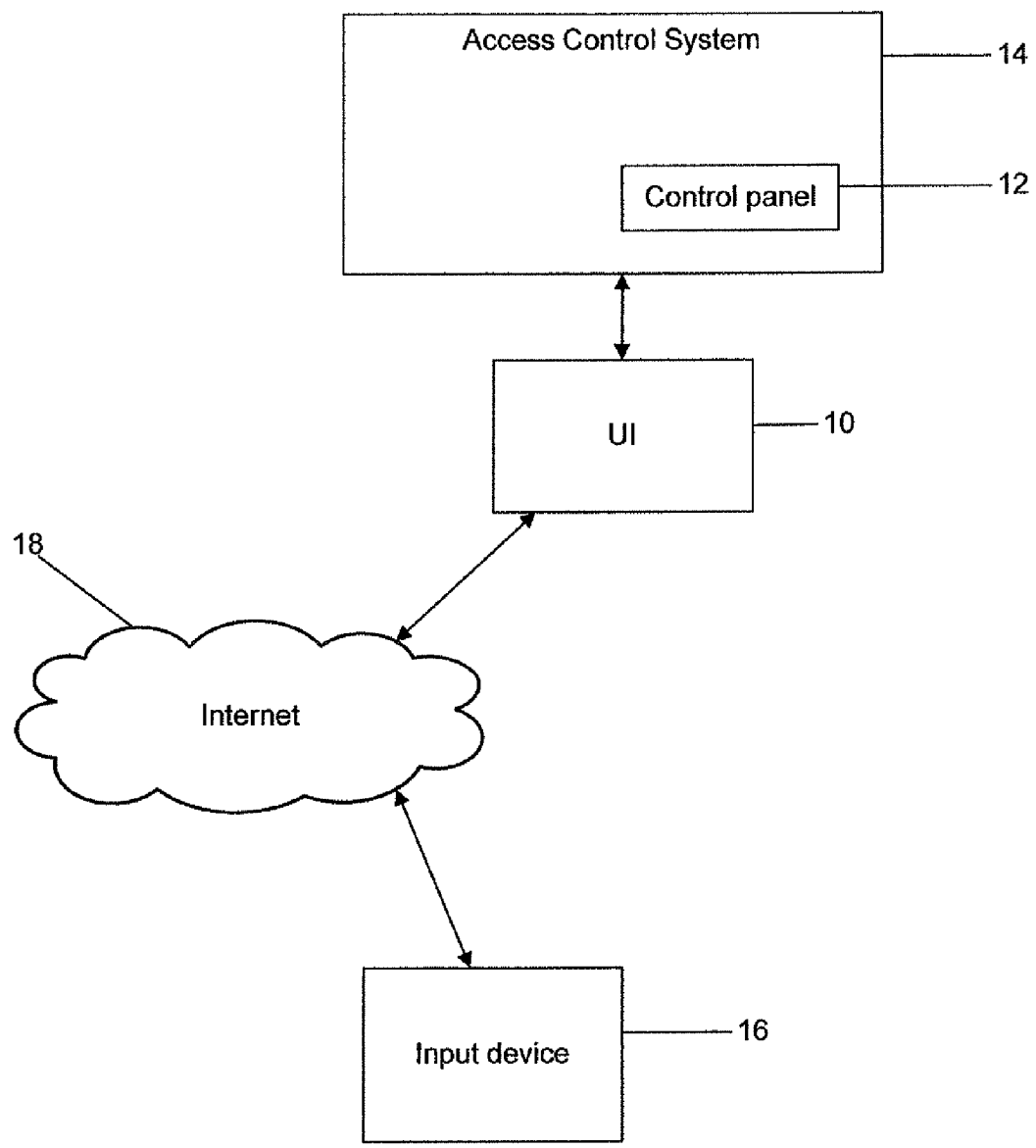
FIG. 1 is a schematic illustration of an exemplary embodiment of the present invention.

The inventive system provides an intuitive, easy-to-understand user interface (UI) for an access control system. This UI can be implemented as software or a computer readable program, stored on computer readable medium, for operating on a computer. FIG. 1 shows the components of an exemplary embodiment. The UI 10 can be accessed directly from a control panel 12 of the access control system 14, or through a user input device 16 via a wired (not shown) or wireless means such as the internet 18. In an alternative embodiment (not shown), the UI 10 can be located on a computer separate from both the access control system 14 and the input device 16. Other architectural models are also within the scope of the invention.

Setup wizards can be provided to guide users through initial access control system 14 setup. Further, various choices or options can be displayed on the control panel 12 and/or the user input device 16 for system upgrading and/or maintenance. Based on the user's responses, that is, user's input or lack thereof, options or controls tailored to the user's knowledge (or lack thereof) are presented through the UI 10. This approach helps to prevent confusion of untrained or novice users by hiding controls, such as advanced features or options, that is, not presenting on the UI 10 those features that are not required for basic use. And yet, advanced features are accessible to users who have indicated they understand them.

In addition, configuration parameters of advanced features are categorized in terms of "typical need", so that even for trained operators, those features that are more obscure or seldom-used are kept hidden from what is required for day-to-day operation. However, the features remain easily accessible if desired.

In this inventive system and method, if the access control system 14 has not yet been configured, the UI 10 will present a series of screens, or displays on the input device 16, that guide the user through all steps required for setup. These screens, which can be created through set up wizards, will ask the user questions to ascertain his level of knowledge of access control systems. Novice users will only be asked to configure the minimum, basic features or functions of the access control system 14, using non-technical language. Expert or knowledgeable users will be given the option to configure more advanced features and setup options in concise, acronym-based language that they can understand. When the access control system 14 setup is complete, the UI 10 will only present the user with parameters for the options they have configured, and by inference, those that they understand. Operation of the system 14 is therefore tailored to both the needs and level of understanding of the user. Additionally, frequently used menu choices are emphasized, so that the user, whatever his level of expertise, is provided subtle cues about what he has done, or not done, in the past.

Figure 2:
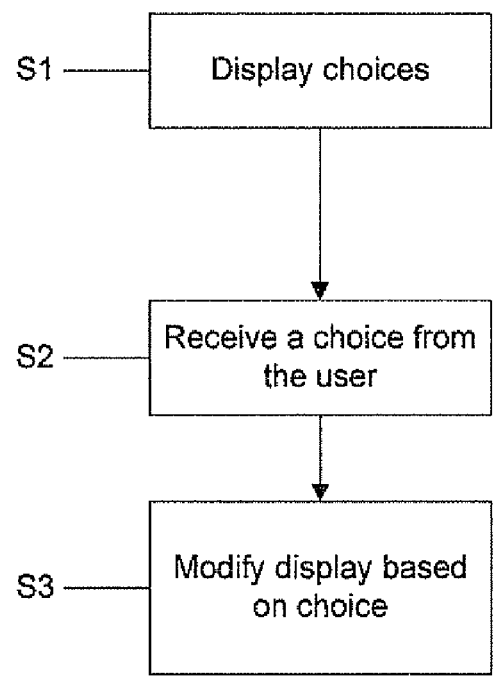
FIG. 2 is a flow diagram of an exemplary embodiment.

FIG. 2 is a flow diagram for an exemplary embodiment. In step S1, the UI 10 displays choices on the input device 16, and prompts the user, who selects a choice in step S2. In step S3, the display is modified based on the choice selected by the user. The modification to the display, based on the user knowledge level, is described in more detail below. The user knowledge level can be determined by a heuristic method, described below, and/or a usage-based method, described below. In addition, in step S3, system 14 parameters can be modified to reflect the user knowledge level.

The Heuristic Method

As discussed above, a heuristic method can be used to more intelligently present or display controls or user choices. Typically, there are four scenarios in which an access control system 14 requires user interaction through its UI 10, and the UI 10 requires only 'yes' or 'no' responses. But if a choice for the user to request additional information explaining how or why a request is being made is added to the UI 10, the user's level of knowledge can be inferred based on whether or not he asks for the additional information. If he does, the system can infer a lesser knowledge level and can modify its presentation in the future by providing more detailed information about the current option or control, hiding more advanced options, or making typical choices without ever requesting user interaction. If the access control system 14 infers that the user is more knowledgeable, it can provide less detail on the UI 10.

FIG. 3 provides examples of these four scenarios including the choices for more information. In scenario (1), a prompt is given for optional information from the user or operator, and he can request the additional information of an explanation of the operation. In scenario (2), a prompt is given for essential information, such as configuration choices; here the user can request an explanation of how the operation is performed or why it is needed. In scenario (3), confirmation that a significant action desired by the user is specifically requested from the user. In this situation, the user can request an explanation or can indicate that he does not want to be informed of this operation ("don't ask this again"). In scenario (4), asynchronous messages of high importance, such as alerts and errors regarding the occurrence of an event in the facility being secured, are displayed, and the user can ask for additional explanation as to why this event occurred.

Users that have never (or rarely) requested additional information about a task or option presented on the UI 10, have never made conflicting choices, or have never made the same change more than once can be categorized as having more expertise with the system 14. This means they have access to all possible options, and that the UI 10 is presented in a manner more conducive to users who have significant knowledge of the access control system 14.

If the user's level of expertise is determined to be less than 'expert', the inventive access control system 14 software automatically simplifies the presentation of the UI 10. Controls or prompts related to expert-level functions are hidden and terminology is restricted to non-technical, everyday language rather than acronym-based access control terminology.

Figure 4:
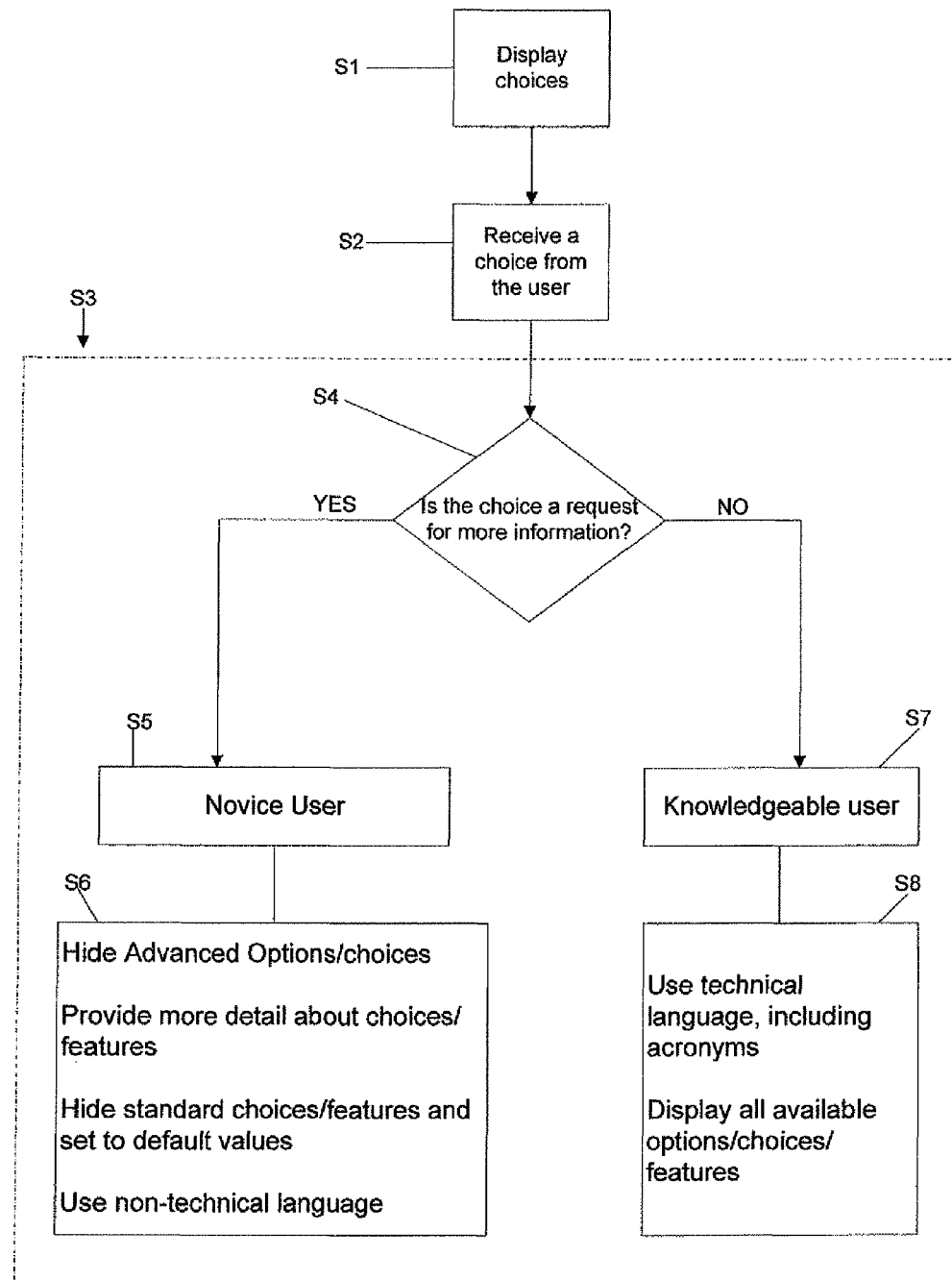
FIG. 4 is a flow diagram of the steps carried out by the heuristic approach of the present invention.

FIG. 4 is a flow diagram of the steps of the heuristic method, that is, the modify display step (S3) shown in FIG. 2. Steps S8 and S2 perform the same functions as described above. In step S4, the UI 10 determines whether the choice infers a knowledgeable user based on if the choice is a request for more information. For example, as shown in FIG. 3, the choice can be "explain", "how", or "why". Other such choices can also be used. If the choice is a request for more information (S4=YES), then step S5 is performed, flagging or marking that the user is a novice or has a lesser knowledge level. In step S6, the display is modified to reflect that the user is a novice. This can be done by, for example, hiding advanced options or choices, providing more detail in response to the user's choice, displaying only non-technical language, and/or hiding standard features and setting them to default values.

Otherwise (S4=NO), in step S7 the user is marked as knowledgeable. In step S8, the display is modified to reflect the user's higher knowledge level. For example, technical language along with acronyms can be displayed, and all available options or features can be shown.

The Usage-Based Method

As discussed above, a usage-based method can be used to promote or emphasize specific controls or user choices. This method keeps track of how often specific controls are used to change parameters in the system. The first change to a parameter from its default value will promote or upgrade the significance of the control or choice used to change the parameter from "normal" to "has been changed by user". A control in this state would be emphasized by, for example, being bolded or made bolder, being emphasized in some way, being marked with an asterisk, being outlined, or being enlarged or made larger to indicate that it has been changed from its default value.

Figure 5:
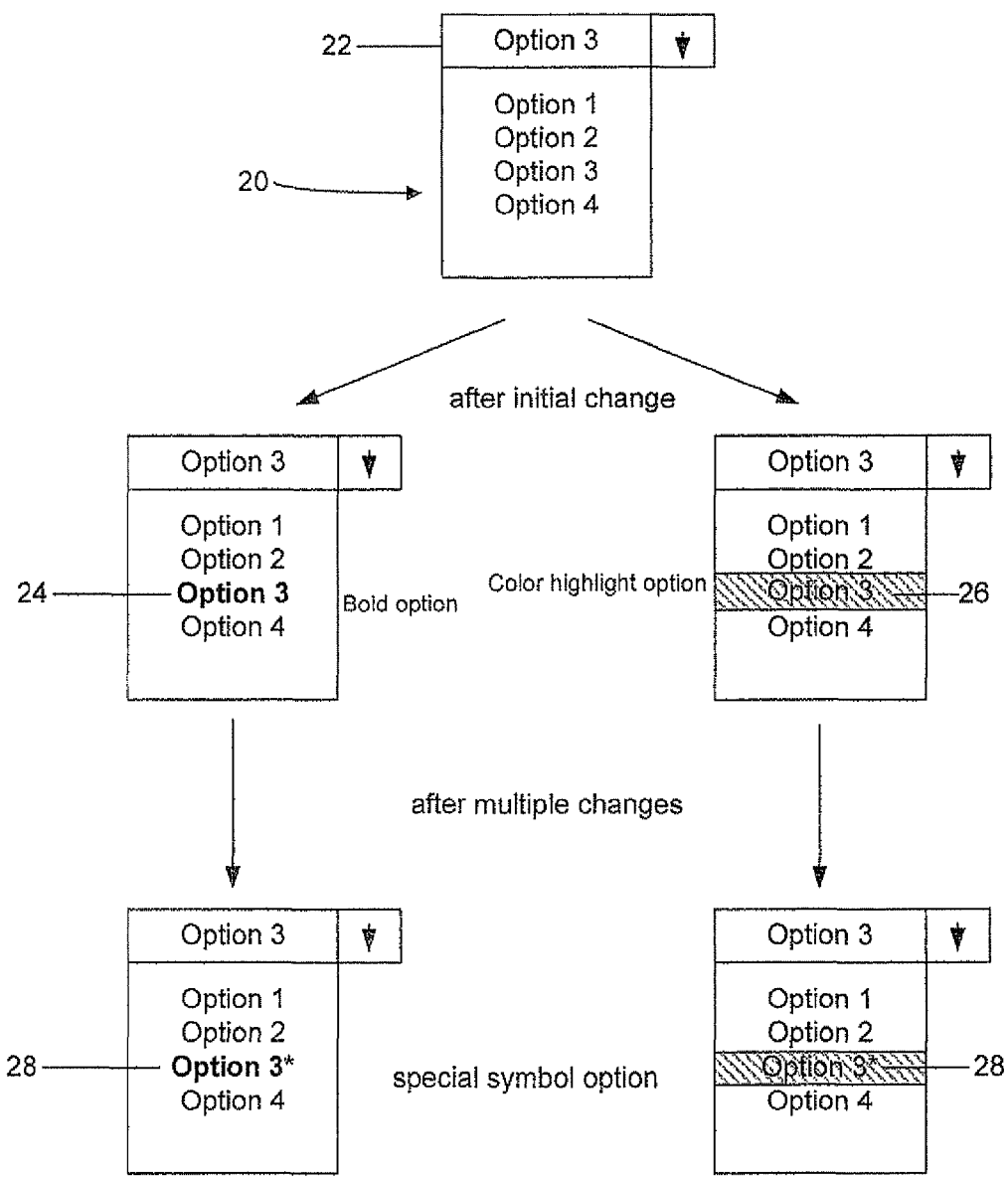
FIG. 5 shows an example of displays promoting an option.

FIG. 5 illustrates changes to the display in one example of the usage-based method. Initially, a choice of options is displayed 20, and the user selects option 3 22. After this first interaction or user choice selection, the display of "option 3" is modified. If the user has chosen "bold" as his emphasizing technique, option 3 is displayed in bold face 24 as shown on the left. If the user has chosen "highlight" as his emphasizing technique, option 3 is displayed as highlighted text 26 in accordance with a color highlight option as shown on the right. If, after multiple changes to the same control, the user continues to select option 3' then an additional emphasizing technique, such as an asterisk 28, further promotes or emphasizes option 3, in addition to either the bold face 24, shown on the left, or the highlighting 26, shown on the right. The number of changes constituting "multiple changes" can be, for example, a system parameter established when the access control system 14 is setup.

In one embodiment, the multiple changes to the same control will cause that control's significance to be promoted to "frequently changed by user". In this case, the appearance of the control would be made even more obvious to the user by making it larger, changing its color, placing it more prominently in the UI 10, or some combination thereof. In this way, the users can make their most frequent changes to the system 14 more easily because the presentation of the controls they use frequently will be optimized or emphasized for easy access.

Figure 6:
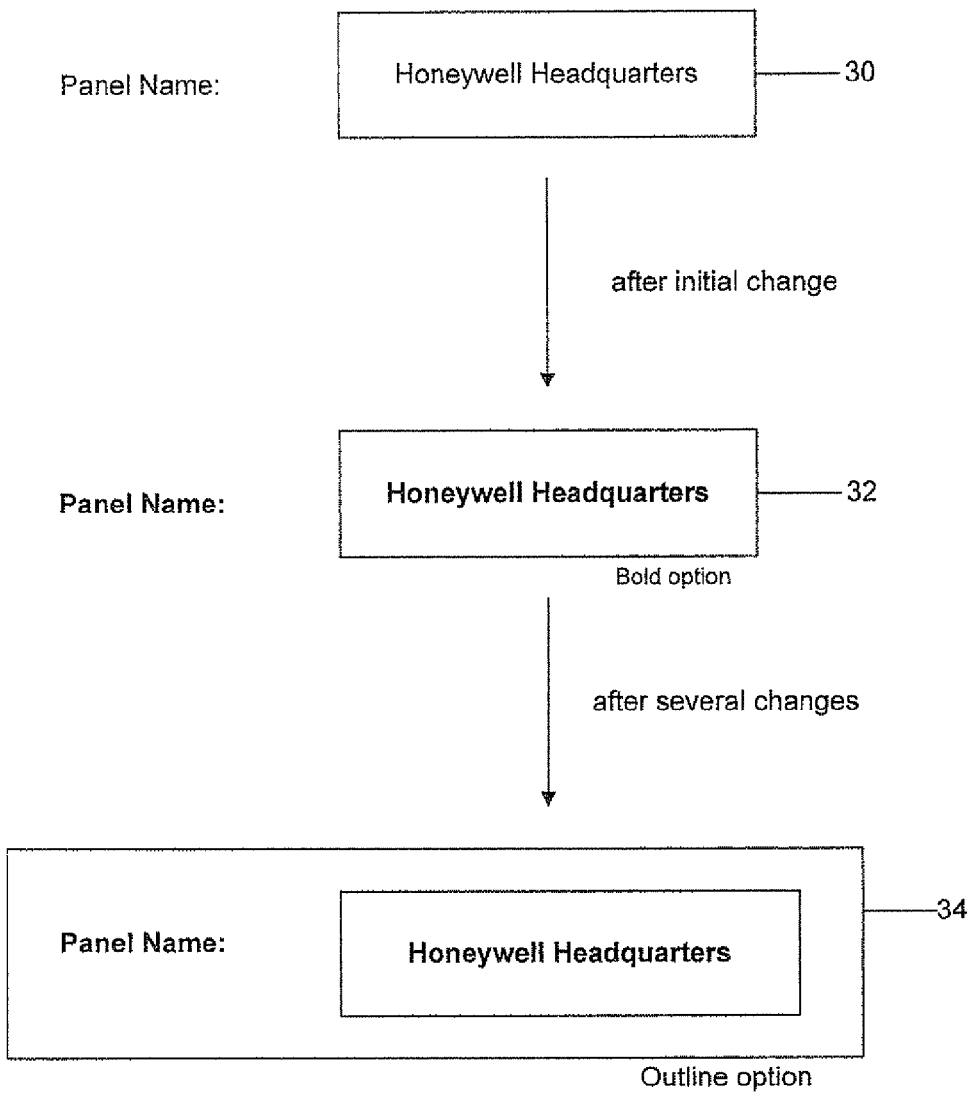
FIG. 6 shows another example of displays promoting another option.

FIG. 6 illustrates other changes to the display in another example of the usage-based method. Initially, a Panel Name of Honeywell Headquarters 30 is displayed. After this initial display, if the panel is changed in response to a user request, the text may be bolded 32. If multiple changes are made to the panel, it can be further emphasized using an outline option 34.

Once promoted, controls may be demoted after crossing a threshold for disuse. The disuse threshold may be either time-based, opportunity-based, or both. A time-based threshold is crossed after some pre-determined interval of time has elapsed without the control being used; this interval could be in days, weeks, months or years. An opportunity-based threshold is crossed when the UI 10 of the system 14 has presented the control to the user some pre-determined number of times but the user has elected not to change it. The opportunity-based disuse threshold is usually more significant than a time-based threshold.

Two categories of types of controls that would benefit from the usage-based method are non-essential configuration parameters, and feature-dependent parameters. Non-essential configuration parameters are those for which the system 14 will assign a default value if the user does not assign or provide one, for example, the name of an I/O point. Feature-dependent parameters are relevant to the system 14 only when an optional feature has been turned on, or if optional information has been assigned. The assignment of a site code or the specification of optional information in a credential are examples of "feature-enabled" pieces of information. If a user has not specified these items in any of the system's credentials, the UI 10 can deduce that the user places a low value on these items. Consequently, the controls to add or change this optional information would be demoted, by, for example, moving them off of the general "Add Credential" screen and onto an "Advanced" menu option on that screen.

Controls which change parameters that are required for the basic operation of the system 14, such as a network address, are usually configured by the user once when the system 14 is installed and rarely, if ever, changed again. Therefore, the user's interaction with the UI 10 will not be significantly enhanced by applying a usage-based promotional method to controls used to change these types of parameters.

Indeed, applying a usage-based promotional method to every control in the UI 10 can detract from the user's ease of operation of the UI 10 as much as it can enhance it. Consequently, the decision as to which controls are to be impacted by the usage-based method can be as important to an enhanced user experience as the method itself.

Figure 7:
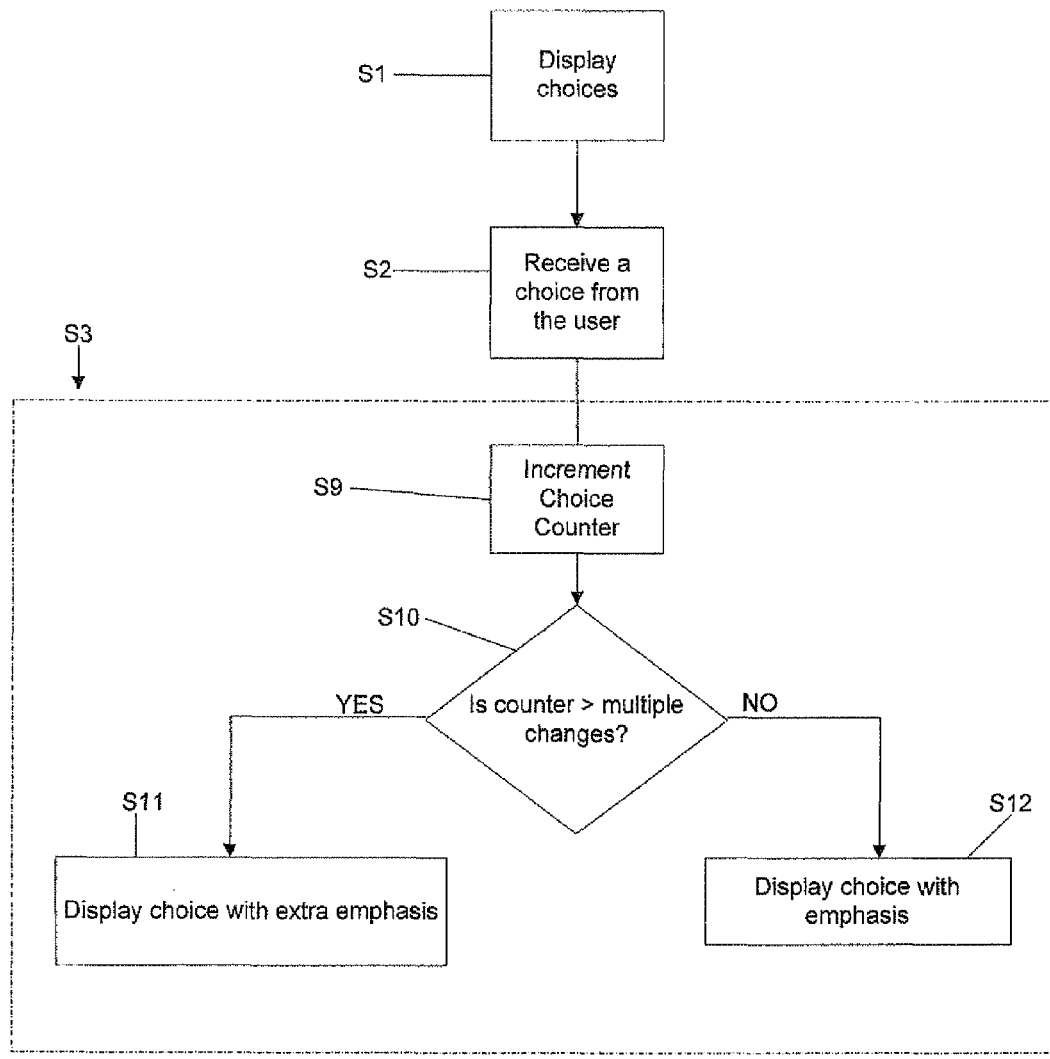
FIG. 7 is a flow diagram of the steps carried out by the usage-based approach of the present invention.

FIG. 7 shows a flow diagram of the steps of the usage-based method, that is, the modify display step (S3) shown in FIG. 2. Steps S1 and S2 perform the same functions as described above. In step S9, the system 14 increments a counter for the received choice. If the counter indicates that multiple changes have been made to the received choice (S10=YES), it is promoted and displayed in step S11 with extra emphasis, such as an asterisk. Otherwise (S10=NO), the received choice is displayed in step S12 with emphasis, such as bold face or highlighting.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for interfacing an access control system controlling access to a facility and an input device, comprising the steps of:
    the access control system displaying, on the input device, a set of choices from a plurality of choices that together control operation of the access control system through the input device wherein at least one of the plurality of choices is a request for information about another of the plurality of choices and wherein at least one of the plurality of choices is a request for additional information regarding the occurrence of an event in the facility being secured;
    receiving one choice of said displayed set of choices; and
    modifying said displayed set of choices based on said one choice, wherein said step of modifying includes hiding at least some of the plurality of choices to expert-level functions based upon the number of times the request for information about another of the plurality of choices has previously been selected; and
    displaying, on the input device, said modified set of choices.

2. The method according to claim 1, the heuristic method comprising steps of: if said one choice is a request for additional information, modifying said displayed set of choices to include the additional information, and to exclude advanced choices and typical choices; and if said one choice is not the request for the additional information, modifying said displayed set of choices to include the advanced choices and the typical choices.

3. The method according to claim 2, wherein the set of choices are setup choices.

4. The method according to claim 1, the usage-based method comprising steps of: incrementing a count of said one choice; if said count is greater than a multiple choices, modifying said displayed set of choices to extra emphasize said one choice; and if said count is not greater than the multiple choices, modifying said displayed set of choices to emphasize said one choice.

5. The method according to claim 4, wherein the emphasize is performed by one of bolding, Outlining, and highlighting said one choice.

6. The method according to claim 4, wherein the extra emphasize is performed by the emphasize said one choice and adding an asterisk to said one choice.

7. The method according to claim 1, wherein the input device can be accessed through the internet.

8. The method according to claim 1, wherein the input device can be accessed through a control panel of the access control system.

9. A computer readable medium having computer readable program for operating on a computer for interfacing, an access control system controlling access to a facility and an input device, said program comprising instructions that cause the computer to perform the steps of:
    displaying, on the input device, a set of choices from a plurality of choices that control operation of the access control system through the input device wherein at least one of the plurality of choices is a request for information about another of the plurality of choices and wherein at least one of the plurality of choices is a request for additional information regarding the occurrence of an event in the facility being secured;

receiving one choice of said displayed set of choices; and modifying said displayed set of choices based on said one choice, wherein said step of modifying includes hiding at least some of the plurality of choices to expert-level functions based upon the number of times the request for information about another of the plurality of choices has been previously selected; and displaying, on the input device, said modified set of choices.

10. The computer readable program according to claim 9, the heuristic method comprising steps of: if said one choice is a request for additional information, modifying said displayed set of choices to include the additional information, and to exclude advanced choices and typical choices; and if said one choice is not the request for the additional information, modifying said displayed set of choices to include the advanced choices and the typical choices.

11. The computer readable program according to claim 10, wherein the set of choices are setup choices.

12. The computer readable program according to claim 9, the usage-based method comprising steps of: incrementing a count of said one choice; if said count is greater than a multiple choices, modifying said displayed set of choices to extra emphasize said one choice; and if said count is not greater than the multiple choices, modifying said displayed set of choices to emphasize said one choice.

13. The computer readable program according to claim 12, wherein the emphasize is performed by one of bolding, outlining, and highlighting said one choice.

14. The computer readable program according to claim 12, wherein the extra emphasize is performed by the emphasize said one choice and adding an asterisk to said one choice.

15. The computer readable program according to claim 9, wherein the input device can be accessed through the Internet.

16. The computer readable program according to claim 9, wherein the input device can be accessed through a control panel of the access control system.

* * * * *